United States Patent [19]

Reimerdes et al.

[11] Patent Number: 5,786,020
[45] Date of Patent: Jul. 28, 1998

[54] INSTANT PRODUCT OF CEREAL IN ADMIXTURE WITH VEGETABLE MATTER

[75] Inventors: Ernst H. Reimerdes, Pully; Pierre Dupart, Winterthur; Osvaldo Geromini, Valeyres/Rances; Jean-Jacques Desjardins, Denges, all of Switzerland

[73] Assignee: Nestec S.A., Vevey, Switzerland

[21] Appl. No.: 574,657

[22] Filed: Dec. 19, 1995

[30] Foreign Application Priority Data

Dec. 22, 1994 [EP] European Pat. Off. ............ 94810747

[51] Int. Cl.⁶ .................................................... A23L 1/168
[52] U.S. Cl. .................. 426/619; 426/449; 426/451; 426/516; 426/557; 426/618; 426/620; 426/621
[58] Field of Search .................... 426/618, 619, 426/620, 621, 443, 449, 451, 557, 516

[56] References Cited

U.S. PATENT DOCUMENTS

| | | | |
|---|---|---|---|
| 4,517,215 | 5/1985 | Hsu | 426/557 |
| 4,540,592 | 9/1985 | Myer et al. | |
| 4,544,563 | 10/1985 | Lechthaler | |
| 4,568,550 | 2/1986 | Fulger et al. | |
| 4,769,251 | 9/1988 | Wenger | |
| 4,837,112 | 6/1989 | Calandro | |
| 4,840,808 | 6/1989 | Lee et al. | 426/270 |
| 4,935,251 | 6/1990 | Verhoef et al. | 426/94 |
| 4,978,552 | 12/1990 | Kurokawa et al. | |
| 5,188,860 | 2/1993 | Hemann | |
| 5,211,977 | 5/1993 | Hauser | |
| 5,385,746 | 1/1995 | De Almeida | |
| 5,451,423 | 9/1995 | Huet | |
| 5,508,053 | 4/1996 | Villota et al. | 426/557 |
| 5,514,387 | 5/1996 | Zimmerman et al. | 426/74 |

FOREIGN PATENT DOCUMENTS

| | | |
|---|---|---|
| 0591793 | 4/1994 | European Pat. Off. |
| 944589 | of 1949 | France |
| 2014423 | of 1979 | United Kingdom |
| 9317592 | of 1993 | WIPO |

*Primary Examiner*—Lien Tran
*Attorney, Agent, or Firm*—Vogt & O'Donnell, LLP

[57] ABSTRACT

A process of making a dried, cooked, extrudate cereal and vegetable composition of, in admixture, by weight dry matter, from 2% to 90% vegetable matter, from 8% to 96% gelatinized cereal matter and from 2% to 15% fat and having an apparent density of from 100 g/l to 500 g/l. The composition is prepared by cooking a mixture of, by weight, from 9 to 110 parts cereal, from 7 to 300 parts vegetable purée, from 2 to 15 parts fat and which has a water content of between more than 23% and less than 70% in an extruder and prior to extrusion of the cooked product from the extruder, allowing steam to escape from the mixture and extruder so that an extrudate product extruded from the extruder has a water content of from 15% to 23%, and then, the extrudate product is cut and dried.

15 Claims, No Drawings

INSTANT PRODUCT OF CEREAL IN ADMIXTURE WITH VEGETABLE MATTER

BACKGROUND OF THE INVENTION

The present invention relates to instant cereals and particularly to instant food products wherein cereal is in admixture with vegetable matter and to preparation of the same.

Various processes of preparation, by cooking-extrusion, of instant cereals, especially for baby foods, are known.

PCT Patent Application Publication No. WO 93/17592 (SCHAAF TECHNOLOGIE GMBH) describes a process for the preparation of instant cereals, especially instant cereals with added vegetables, in which there is cooked-extruded at 130°–160° C. a mixture of cereals to which dry vegetables and vegetable puree, for example, may be added, and which has a water content of 19–22%, the cooked-extruded mixture is allowed to expand in an expansion chamber immediately after coming out of the extruder die, and the cooked-extruded mixture is cut upon coming out of the expansion chamber into pieces having an open porosity over the slice, it being possible for these pieces to be used in mixtures for instant babies' cereal for example.

SUMMARY OF THE INVENTION

The aim of the present invention is to provide instant cereals with added vegetables which do not disintegrate on coming into contact with a liquid but remain, on the contrary, crispy during a relatively long time.

To this end, the instant cereals with added vegetables according to the present invention comprise, in % by weight of dry matter, 2–90%, preferably 2–50% of vegetable, 8–96%, preferably 48–96% of cereal, 2–15% of added fat, 0–1% of a calcium salt, 0–1% of sodium chloride, 0–5% of added protein material and 0–1.5% of a colouring agent, and they have an apparent density of 100–500 g/l, preferably 200–500 g/l and a water content of 1.5–15%.

Likewise, in the process for the preparation of instant cereal flakes with added vegetables according to the present invention, a mixture having a water content between more than 23 and 70% by weight and comprising, in parts and percentage by weight, 9–110 parts, preferably 50–110 parts of cereal, 7–300 parts, preferably 7–170 parts of a vegetable puree, 0–20 parts of vegetable powder, 2–15 parts of added fat, 0–1% of a calcium salt, 0–1% of sodium chloride, 0–5% of added protein material and 0–1.5% of a colouring agent is cooked-extruded in an extruder, a quantity of steam is aspirated and/or allowed to escape before the extrudate comes out of the extruder such that the cooked-extruded mixture has after coming out of the extruder a water content of 15–23%, the cooked-extruded mixture is cut up upon coming out of the extruder and it is dried. The cereal with added vegetable product of the invention, as referred to herein, is thus a composition wherein the cereal and vegetable matter are in admixture.

It was observed that the present cereals with added vegetables having these characteristics, and the present process which makes it possible to produce such cereals with added vegetables, meet surprisingly the objective set.

These cereals with added vegetables can indeed be consumed as such or as essential ingredient in the preparation of a dessert containing milk or yogurt, a muesli, a porridge or an instant soup, they have in each case a remarkable crispness even after a few min in a cold, hot, or even boiling liquid for example.

This is due to the fact that they have a relatively low porosity and are not open at the surface, a relatively high apparent density and a relatively solid texture which softens only slowly on coming into contact with a liquid, due in particular to their oil content.

DETAILED DESCRIPTION OF THE INVENTION

In the present invention, the starch of the present cereals with added vegetables, preferably has a degree of gelatinization of 50–92%, more particularly of 70–90%. Such a degree of gelatinization of the starch in fact favours some resistance of the present cereals to softening during the absorption of a liquid in which they are immersed while being sufficient to confer the instant characteristic upon them.

The said vegetable may be any leaf vegetable, fruit vegetable, root vegetable, seed vegetable or tuber vegetable which has a substantial content of vegetable fibre, such as spinach, beans, peas, lentils, carrots or yam for example, these vegetable fibres contributing to the firmness of the texture of the present cereals with added vegetables.

The said cereal may be any cereal, especially any cereal which is relatively low in gluten such as maize, or rice for example.

The said added fat is intended, on the one hand, to facilitate the cutting of the cooked-extruded mixture and, on the other hand, to reinforce and stabilize the texture of the present cereals with added vegetables by reducing water regain, namely by preventing water from reaching the starch matrix too rapidly. To this end, the said added fat is preferably a vegetable or animal oil having a melting point greater than about 35° C. as well as a good resistance to oxidation, such as hydrogenated palm oil for example.

The said calcium salt may be any edible calcium salt capable of contributing to the relative firmness of the texture of the flakes, especially calcium carbonate or phosphate for example.

The said added protein material is intended to reinforce the texture of the present cereals with added vegetables and to reduce the water regain. To this end, the said added protein material may be a caseinate or gluten, for example. It is preferably a mixture of sodium caseinate and of calcium caseinate, the former being more soluble than the latter, but the latter conferring more hardness on the present cereals with added vegetables than the former.

The said colouring agent may be any colouring agent authorized for food use, especially for use in baby foods, in particular as oleoresin from a spice such as paprika for example.

In order to implement the process according to the present invention, it is possible to use a single- or twin-screw extruder turning at 200–500 revolutions/min, whose casing has one or more feed openings upstream, at least one steam release or aspiration opening downstream and a jacket for the circulation of a heating liquid for example. This extruder may be equipped with a die having one or more outlets, of circular cross-section or having the shape of an easily recognizable motif such as a star, a rabbit or a carrot, of about 1–10 mm in diameter, as well as a rotating knife whose blades slide against the said outlets for example.

The mixture which it is possible to cook-extrude with such an extruder therefore has a water content of between more than 23 and 70%, preferably of between more than 23 and 60% by weight. This relatively high water content is intended to prevent the expansion of the mixture upon coming out of the extruder, in cooperation with the said 2–10% of added fat and the said fibres.

This water content of the mixture to be cooked-extruded is provided mainly by the said vegetable in the form of a puree, in other words in the form of a fresh or frozen vegetable which is reduced to a puree by grinding for example. But the vegetable dry matter content of the present cereals can therefore be adjusted by providing the said vegetable in powdered form, in other words in the form of a vegetable reduced to a powder by dehydration and grinding for example.

A quantity of steam should be allowed to escape before coming out of the extruder such that the cooked-extruded mixture has after coming out a water content of 15–23%, preferably 17–23%. Indeed, if the cooked-extruded mixture has a water content greater than 23%, there is a risk of not being able to cut it upon coming out of the extruder because it sticks to the blades of the rotating knife. And if the cooked-extruded mixture has a water content of less than 15%, or even 17%, there is a risk of causing it to expand excessively upon coming out of the extruder and to weaken and destabilize the texture of the present cereals with added vegetables.

It is possible to cook-extrude the said mixture at 140°–250° C., preferably at a temperature of between more than 160° C. and 200° C., for 20–60 s at 10–100 bar. This relatively high temperature region can be recommended in order to obtain good aspiration and/or good release of steam before coming out of the extruder. This region of relatively short durations can be recommended in order to remain below a degree of gelatinization of 100% of the starch contained in the mixture, especially in order to obtain the said preferred degree of gelatinization of 50–92%, more particularly of 70–90%.

By cutting the cooked-extruded mixture upon coming out of the extruder, it is possible to obtain pellets whose general shape is conferred by the shape of the cross-section of the die outlets. It is thus possible to obtain pellets which are spherical or which have the general shape of easily recognizable motifs such as stars, rabbits or carrots for example.

In a specific embodiment of the present process, such pellets are rolled into flakes. To do this, it is possible to use a rolling mill having several rollers with adjustable interstices and exerted pressure. Preferably, the said pellets are rolled into flakes 0.5 to 2 mm thick.

The present cereals with added vegetables, in the form of pellets or flakes, can finally be dried to a residual water content of 1.5–15 %, preferably 3–10 %, in a hot air dryer at atmospheric pressure or reduced pressure for example.

These cereals with added vegetables can therefore be consumed as such or as essential ingredient in the preparation of a dessert containing milk or yogurt, a muesli, porridge or an instant soup for example. But they can also be provided in the form of whole cereals at the surface of which adhere other ingredients, added after the cooking-extrusion, such as seeds, especially sesame seeds, aromatic herbs, spices and/or basic traditional components of instant soups or broths for example.

EXAMPLES

The examples below illustrate various embodiments of cereals with added vegetables and of the process for the preparation of cereals with added vegetables according to the present invention. The percentages and parts are indicated therein by weight.

Example 1

A twin-screw extruder 1.2 m in length is fed continuously with the various components of a mixture having a water content of 28.7%.

The extruder casing has several feed openings upstream, a steam release opening downstream and a jacket for the circulation of a heating liquid. The extruder die has two outlets of circular cross-section 3 mm in diameter. The mixing of the various components is carried out in the extruder itself.

The various components, their water content, their feed rate and the percentage which their dry matter (DM) represents in the total dry matter (DMtot) content of the mixture are presented in the table below:

TABLE 1

| Component | Water content (%) | Rate (kg/h) | DM/DMtot (%) |
|---|---|---|---|
| Maize flour | 11 | 80 | 86.9 |
| Carrot purée | 92 | 27 | 2.7 |
| Hydrogenated palm oil | — | 8 | 9.8 |
| Colouring (10% paprika oleoresin + 90% oil) | — | 0.5 | 0.6 |

The extruder screws are rotated at 350 revolutions/min. The cooking-extrusion is carried out at 195° C. for 30 s at 28 bar while allowing a quantity of steam to escape such that the cooked-extruded mixture has a water content of 16%.

The pudding of cooked-extruded mixture coming out of the die is cut into pellets of about 4 mm in diameter with a rotating knife whose blades slide against the outlets.

The pellets are rolled between rollers 20 cm in diameter turning at 500 revolutions/min, while maintaining the surface temperature of the rollers at 20° C. and while exerting on the rollers a pressure of 24 bar.

The rolled pellets are dried to a water content of 5%.

Crisp flakes 1.0–1.4 mm thick are obtained which have a nice orange-carrot colour, a degree of gelatinization of 75% and an apparent density of 330 g/l.

Their shape, their size and their crispness are maintained well even after being in a cold, hot, or even boiling liquid for a few min.

Example 2

A twin-screw extruder 1.2 m in length is fed continuously with the various components of a mixture having a water content of 29.8%.

The extruder casing has several feed openings upstream, a steam release opening downstream and a jacket for the circulation of a heating liquid. The extruder die has two outlets of circular cross-section 3 mm in diameter. The mixing of the various components is carried out in the extruder itself.

The various components, their water content, their feed rate and the percentage which their dry matter (DM) represents in the total dry matter (DMtot) content of the mixture are presented in Table 2 below:

TABLE 2

| Component | Water content (%) | Rate (kg/h) | DM/DMtot (%) |
|---|---|---|---|
| Maize flour | 11 | 80 | 77.3 |
| Red kidney bean purée | 72 | 41.9 | 12.7 |
| Hydrogenated palm oil | — | 8 | 8.7 |
| Colouring (10% paprika oleoresin + 90% oil) | — | 1.2 | 1.3 |

The extruder screws are rotated at 350 revolutions/min. The cooking-extrusion is carried out at 190° C. for 30 s at 28 bar while aspirating a quantity of steam such that the cooked-extruded mixture has a water content of 20%.

The pudding of cooked-extruded mixture coming out of the die is cut into pellets of about 4 mm in diameter with a rotating knife whose blades slide against the outlets.

The pellets are rolled between rollers 20 cm in diameter turning at 500 revolutions/min, while maintaining the surface temperature of the rollers at 20° C. and while exerting on the rollers a pressure of 24 bar.

The rolled pellets are dried to a water content of 8%.

Crisp flakes 1.0–1.5 mm thick are obtained which have a brown-red colour, a degree of gelatinization of 72% and an apparent density of 300 g/l.

Their shape, their size and their crispness are maintained well even after being in a cold, hot, or even boiling liquid for a few min.

Examples 3–5

Under operating conditions similar to those described in Example 1, with the exception of the fact that the extruder die has outlets with the shape of a star, a rabbit or a carrot, and that the pellets obtained are not rolled out by cutting the pudding of cooked-extruded mixture coming out of the die, cereals with added vegetables are prepared having the respective compositions presented in Table 3 below. The figures indicated represent the percentage of dry matter (DM) of each component in the total dry matter content (DMtot) of the pellets.

TABLE 3

| Component | Example 3 | Example 4 | Example 5 |
| --- | --- | --- | --- |
| Maize flour | 77.46 | 86.5 | 80.45 |
| Red kidney bean purée | 13.3 | — | — |
| Carrot purée | — | 3.25 | — |
| Green pea purée | — | — | 10.0 |
| Hydrogenated palm oil | 8.8 | 9.75 | 9.1 |
| Calcium carbonate | 0.44 | — | 0.45 |
| Calcium caseinate | — | 0.25 | — |
| Sodium caseinate | — | 0.25 | — |

All these crisp pellets, with the shape of a star, rabbit or carrot, have a colour which evokes that of the vegetable which they contain, a degree of gelatinization of 70–90%, an apparent density of 200–450 g/l and a water content of 5–8%.

Their shape, their size and their crispness are maintained well even after being in a cold, hot, or even boiling liquid for several min.

Example 6

A mixture of the crisp pellets with added carrots, and with added green peas prepared in Examples 4 and 5 is used at a content of 50% by weight in a dry composition, the other half of which is itself composed of:

| | |
| --- | --- |
| acidified powdered milk | 67.0% |
| guar gum | 1.5% |
| sugar | 10.0% |
| salt and spices | 1.0% |
| malt | 9.5% |
| grated coconut | 7.5% |
| citric acid | 3.5% |

This composition is consumed as a dispersion in milk, at a content of 38 g of composition per 100 g of milk, as a cold, nutritious and refreshing savoury milk-containing dessert.

We claim:

1. A process for preparing a food product comprising: cooking a mixture in an extruder to cook the mixture and extruding cooked mixture from the extruder to obtain an extrudate product from the extruder, wherein the mixture comprises by weight, from 9 parts to 110 parts cereal, from 7 to 300 parts vegetable puree, from 2 parts to 15 parts fat and has a water content in a range of more than 23% and less than 70%, and prior to extrusion of cooked mixture from the extruder, allowing steam to escape from the cooking mixture from within the extruder so that the extrudate product extruded and obtained from the extruder has a water content of from 15% to 23%;

cutting the extrudate product to obtain cut pieces; and drying the cut pieces to obtain a dried product.

2. A process according to claim 1 wherein the mixture is cooked, the steam is allowed to escape and the cut pieces are dried so that the dried product has a degree of starch gelatinization of from 50% to 92%.

3. A process according to claim 2 wherein the mixture is cooked, the steam is allowed to escape and the cut pieces are dried so that the dried product has a degree of starch gelatinization of from 70% to 90%.

4. A process according to claim 1 wherein the steam is allowed to escape so that the extrudate product has a water content of from 17% to 23%.

5. A process according to claim 1 wherein the mixture is cooked at a temperature of from 140° C. to 250° C. for from 20 seconds to 60 seconds and under a pressure of from 10 bar to 100 bar.

6. A process according to claim 1 or 2 further comprising, prior to drying, passing the cut pieces between rollers to form cut piece flakes.

7. A process according to claim 6 wherein the cut pieces are rolled so that the flakes have a thickness of from 0.5 mm to 2.0 mm.

8. A process according to claim 1 wherein the cut pieces are pellets and further comprising passing the pellets between rollers to obtain flakes having a thickness of from 0.5 mm to 2.0 mm.

9. A process according to claim 1 wherein the mixture further comprises a member selected from the group consisting of a protein material and calcium salt components.

10. A process according to claim 1 wherein the mixture further comprises a member selected from the group consisting of a protein material and calcium salt components and wherein the protein material is in an amount up to 5% and the calcium salt components are in an amount of up to 1%.

11. A process according to claim 9 wherein the protein material is selected from the group consisting of sodium caseinate and calcium caseinate and the calcium salt components are selected from the group consisting of calcium carbonate and calcium phosphate.

12. A process according to claim 1 wherein the mixture further comprises a vegetable powder.

13. A process according to claim 1 wherein the vegetable puree is selected from group consisting of a puree of spinach, beans, peas, lentils, carrots, and yams.

14. A process according to claim 1 wherein the cereal is selected from the group consisting of maize and rice.

15. A process according to claim 1 wherein the mixture comprises from 50 parts to 110 parts cereal, from 7 parts to 170 parts vegetable puree, and from 2 parts to 10 parts fat.

* * * * *